US011060935B2

(12) United States Patent
DeRosa et al.

(10) Patent No.: US 11,060,935 B2
(45) Date of Patent: Jul. 13, 2021

(54) PRESSURE TRANSDUCER ASSEMBLY WITH SELECTABLE DAMPING INSERTS (71) Applicant: KULITE SEMICONDUCTOR PRODUCTS, INC., Leonia, NJ (US)

(72) Inventors: Louis DeRosa, Wayne, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 193 days.

(21) Appl. No.: 16/400,474

(22) Filed: May 1, 2019

(65) Prior Publication Data

US 2020/0348200 A1    Nov. 5, 2020

(51) Int. Cl.
*G01L 19/06* (2006.01)
*G01L 19/00* (2006.01)
*G01L 7/00* (2006.01)

(52) U.S. Cl.
CPC .......... *G01L 19/0609* (2013.01); *G01L 7/00* (2013.01); *G01L 19/0007* (2013.01); *G01L 19/0636* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04;
(Continued)

(56) References Cited

U.S. PATENT DOCUMENTS

| 4,866,988 | A | 9/1989 | Brown |
| 4,995,263 | A | 2/1991 | Stocker |
| 4,995,265 | A | 2/1991 | Stocker |
| 5,206,785 | A | 4/1993 | Hukashima |

(Continued)

*Primary Examiner* — Andre J Allen
(74) *Attorney, Agent, or Firm* — Troutman Pepper Hamilton Sanders LLP; James E. Schutz; Mark Lehi Jones (57) ABSTRACT

A reconfigurable pressure transducer assembly having an input tube filter assembly is provided. The resonant frequency and dampening characteristics associate with the pressure transducer assembly may be configured by the input tube filter assembly. The input tube filter assembly includes one or more inserts disposed in an input tube channel, the one or more inserts including one or more bores of selectable dimensions and extending therethrough from a first end to a second end. The one or more inserts define an effective input tube bore, and the input tube filter assembly is tunable by selection of the selectable dimensions of the one or more inserts.

20 Claims, 6 Drawing Sheets

(58) Field of Classification Search
CPC ......... G01L 9/045; G01L 9/125; G01L 11/00;
G01L 17/00; G01L 19/00; G01L 19/0076;
G01L 19/08; G01L 19/141; G01L 19/146;
G01L 1/142; G01L 1/2262; G01L 1/246;
G01L 21/12; G01L 23/16; G01L 27/007;
G01L 7/04; G01L 7/063; G01L 7/084;
G01L 7/086; G01L 7/16; G01L 9/0002;
G01L 9/0007; G01L 9/0016; G01L
9/0019; G01L 9/0022; G01L 9/0027;
G01L 9/0033; G01L 9/0039; G01L 9/005;
G01L 9/0058; G01L 9/0077; G01L
9/0079; G01L 9/008; G01L 9/0092; G01L
9/0095; G01L 9/025; G01L 9/08; G01L
9/085; G01L 9/105; G01L 9/14; G01L
9/16
USPC .................................................... 73/700–756
See application file for complete search history.

(56) References Cited

U.S. PATENT DOCUMENTS

| | | | |
|---|---|---|---|
| 5,228,344 A | 7/1993 | Hojoh | |
| 7,597,004 B1* | 10/2009 | Kurtz | ................. G01L 19/0609 73/715 |
| 2011/0107840 A1 | 5/2011 | Kurtz et al. | |
| 2011/0185818 A1* | 8/2011 | Kurtz | ...................... G01L 7/022 73/721 |
| 2012/0011936 A1 | 1/2012 | Hurst et al. | |
| 2012/0060619 A1* | 3/2012 | Gardner | ............... G01L 19/0007 73/727 |
| 2012/0085180 A1* | 4/2012 | Carton | ................ G01L 19/0046 73/862.59 |
| 2014/0041457 A1 | 2/2014 | Kurtz et al. | |
| 2014/0260519 A1 | 9/2014 | Hurst et al. | |
| 2016/0370243 A1* | 12/2016 | DeRosa | ............... G01L 19/0609 |
| 2020/0393316 A1* | 12/2020 | DeRosa | ..................... G01L 1/18 |

* cited by examiner

PRESSURE TRANSDUCER ASSEMBLY WITH SELECTABLE DAMPING INSERTS

BACKGROUND

Pressure transducers are often utilized in gas turbine engines and other systems to measure the pressure of the media such as fluids, gasses, etc. In certain pressure measurement applications, it may be desirable to measure the steady state pressure level of the media while avoiding or minimizing the impact of pressure ripples and/or fluctuations. Pumping equipment, for example, can cause pressure ripples in the measurement media that can adversely impact the measurement accuracy and/or lifespan of the pressure transducer.

An internal cavity and/or other mechanical properties of the pressure transducer can result in a structure with a resonant frequency. Subjecting the pressure transducer to pressure ripples having frequencies that match the transducer's structural resonances can damage or reduce the lifespan of the pressure transducer. In these cases, a filter assembly may be placed at the inlet end of the transducer to eliminate the higher frequency ripples and leave static and quasi-static pressures intact. As discussed in U.S. Pat. Nos. 7,975,552, 9,500,533, 9,709,450, and 9,752,948, each assigned to Kulite Semiconductor Products, Inc. and incorporated herein by reference as presented in full, various filters have been designed for coupling with a pressure transducer to reduce resonances near the frequency of the pressure ripple.

Since pressure ripple frequencies can change from system to system, pressure transducers that are specifically designed for each unique system can be costly, impractical, and can lack the flexibility needed for a wide range of applications. Thus, there is a need for a pressure transducer assembly that can be adapted for use with multiple systems and applications.

BRIEF SUMMARY

According to certain exemplary implementations of the disclosed technology, a reconfigurable pressure transducer assembly is provided. The resonant frequency characteristics associate with the pressure transducer assembly may be configured by the insertion of one or more tube inserts into the input tube of the assembly. The tunable pressure transducer includes a housing defining an input tube channel and a cavity channel in communication with the input tube channel. The tunable pressure transducer includes an input tube filter assembly disposed in the input tube channel and in communication with the cavity, the input tube filter assembly includes one or more inserts disposed in the input tube channel, the one or more inserts include one or more bores of selectable dimensions and extending therethrough from a first end to a second end. The one or more inserts define an effective input tube bore, and the input tube filter assembly is tunable by selection of the selectable dimensions of the one or more inserts.

The assembly can include a header positioned within at least a portion of the cavity channel of the housing, where the header and the cavity channel define a cavity in communication with the input tube channel The assembly can further include a sensing element disposed on the header and adjacent to the cavity and an input tube filter assembly disposed in the input tube channel and in communication with the cavity.

According to an example implementation of the disclosed technology, an input tube insert kit is provided. The kit includes an insert holder defining a holder cavity having an inner diameter and a length. The kit includes one or more grouped sets of one or more inserts configured for selection and insertion into the holder cavity. Each insert is characterized by an outer diameter corresponding to the inner diameter of the holder cavity and one or more bores of selectable dimensions, the one or more bores extending therethrough from a first end to a second end of each of the one or more inserts. The one or more grouped sets of the one or more inserts of the kit are further characterized by a number count and corresponding effective length equal to the sum of the lengths of the one or more inserts such that the effective length corresponds to the insert holder cavity length. The one or more grouped sets of the one or more inserts are configured to define an effective input tube bore of a tunable pressure transducer assembly. The effective input tube bore is tunable by selection and insertion of the one or more grouped sets of one or more inserts into the insert holder. In certain example implementations, the kit may further include a header configured to be positioned within at least a portion of the cavity channel of the housing, the header and the cavity channel defining a cavity in communication with the inlet channel. In certain example implementations, the kit may include a sensing element configured to be disposed on the header and in communication with the cavity channel.

According to an example implementation of the disclosed technology, a method is provided. The method includes: providing a housing having an input tube channel in communication with a cavity channel; selecting one or more inserts, each of the one or more inserts comprising one or more bores of selectable dimensions and extending therethrough from a first end to a second end; inserting the one or more selected inserts into the input tube channel to form an input tube bore; providing a header; mounting a sensing element to a header; and securing the header to a portion of the housing to define a cavity in communication with the cavity channel, the sensing element, and the input tube bore.

In accordance with certain example implementations of the disclosed technology, the input tube filter assembly disclosed herein may be utilized to substantially reduce high frequency pressure ripples and allow static and quasi-static pressures to pass through to the sensing element and may be manipulated to tune the pressure transducer assembly to achieve a desired dampening frequency. In certain exemplary implementations, the input tube may comprise an insert holder configured to accept one or more inserts, each insert having a bore extending therethrough from a first side to a second side. In certain example implementations, the filter assembly may be custom tuned to achieve a desired dampening frequency by insertion of selected inserts. The various embodiments of the filter assembly may enable one pressure transducer assembly to be tunable for measuring pressure in many different systems.

DETAILED DESCRIPTION

Exemplary embodiments of the disclosed technology provide a tunable pressure transducer assembly that utilizes a reconfigurable input tube filter adapted to tune the pressure transducer assembly to avoid certain resonant conditions. In accordance with certain example implementations, the disclosed technology may enable mass production of pressure transducer housings with the same structural dimensions of the input tube channel. Certain example implementations of the disclosed technology allow the input tube to be subsequently tuned for a desired application by selecting and inserting groups of tube inserts into the input tube channel to selectively alter the dampening characteristics of the input tube filter. Certain example implementations of the disclosed technology may enable the pressure transducer assembly to be used for a wide variety applications and pressure ripple frequencies.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding of the disclosed technology, while eliminating, for purposes of clarity, many other elements found in typical pressure transducer assemblies and methods of making and using the same. Those of ordinary skill in the art will recognize that other elements are desirable and/or required in order to implement the disclosed technology. However, because such elements are well known in the art, and because they do not facilitate a better understanding of the disclosed technology, a discussion of such elements is not provided herein.

Figure 1:
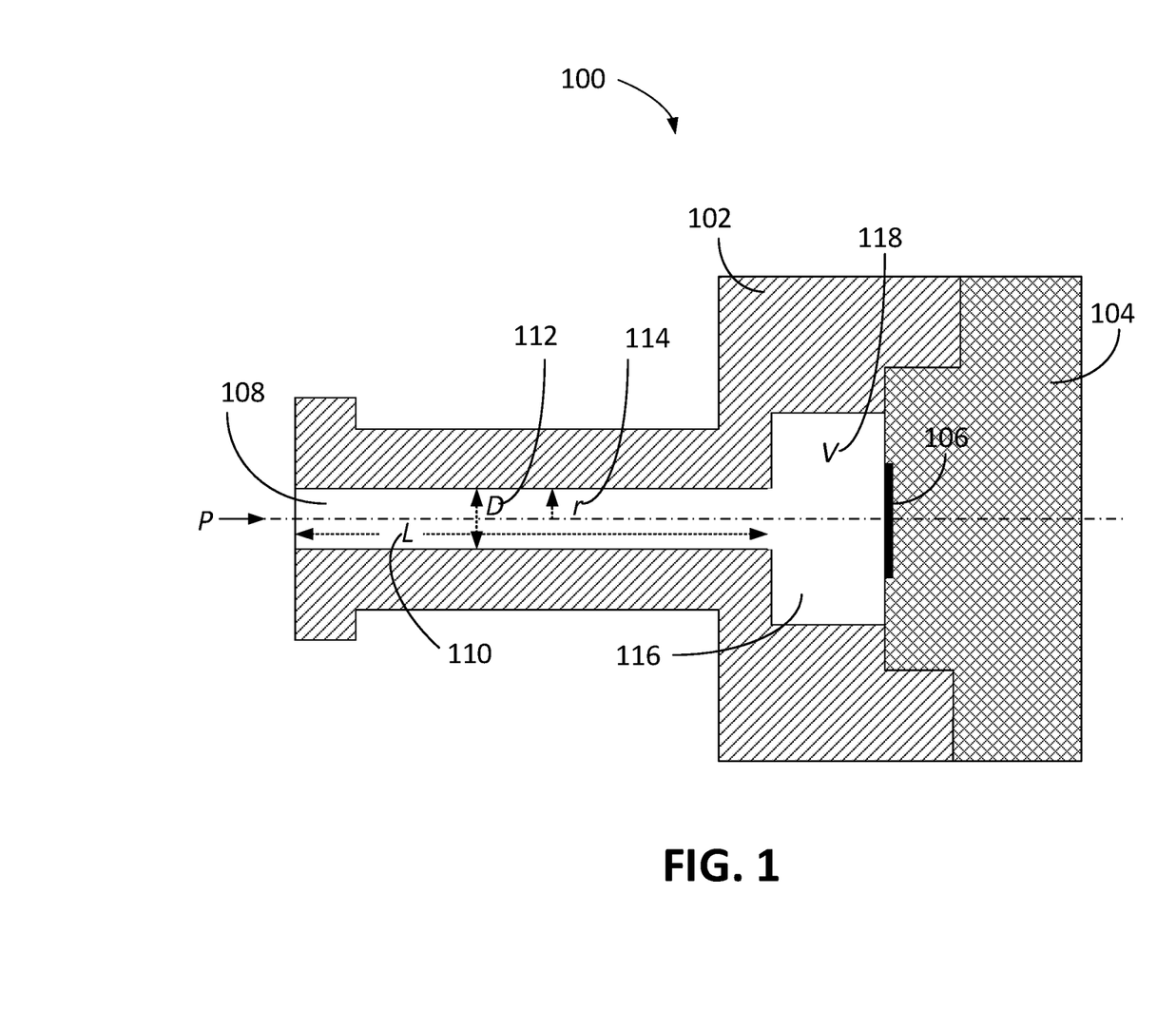
FIG. 1 shows a typical pressure transducer assembly model that may be utilized to illustrate the relationship between the structural dimensions and resonance/damping characteristics of the assembly.

FIG. 1 shows a pressure transducer assembly 100 model in which a housing 102 and a header 104 (with an attached transducer 106) may define the internal dimensions of the associated inlet tube 108 and cavity 116 of the assembly 100.

The transducer assembly 100 model may be utilized to illustrate the relationship between the dimensions of the inlet tube 108 and cavity 116 and the resonance/damping characteristics of the assembly 100. Those skilled in art will appreciate that the system of equations describing the flow of pressure P through a pipe may be reduced to a wave equation in one dimension:

$$\frac{1}{c^2} P'' + \frac{32}{c^2} P' = P',$$

where c is the velocity of sound in the unconfined fluid (measurement media) and K is the fluid bulk modulus. The damping coefficient, —, is dependent on both the pipe diameter D 112 and viscosity (μ) of the media. With appropriate boundary conditions, the wave equation may be solved using Laplace transforms such that the frequency response of the pipe structure may be analytically estimated.

As the equation above illustrates, when the pressure flow is in an inlet tube 108 having a large aspect ratio (for example, a smaller diameter D 112 and long length L 110) the damping is increased. As the flow reaches the cavity 116 of a set volume 118, the flow is further damped as the media expands to fill the cavity 116. By manipulating the diameter D 112 and length L 110 of the inlet tube 108 and the volume 118 of the cavity 116, the damping ratio and cut-off frequency can be well tuned for the respective application. In this way, undesired ripple frequency can be substantially reduced or eliminated, while still retaining lower frequency components that are desirable to measure.

Using standard system dynamic analysis, an equation may be derived for the resonant frequency of the pressure transducer assembly 100 model as shown in FIG. 1. The formula for the resonant frequency F may be expressed as:

$$F = \frac{c \sqrt{(f)}}{},$$

Where r is the internal radius of inlet tube, c is velocity of sound in the pressure media, L is the length of the inlet tube, and V is the volume of the cavity. When an inlet tube 108 and cavity 116 structure is tuned to match the pressure ripple frequency, the ripple pressure can be amplified and can exceed the pressure rating of the transducer 106, the housing 102, and/or other parts of the assembly 100. For example, exceeding the rated pressure can apply excessive stresses on the transducer 106 die and cause the transducer 106 to fail. Furthermore, a breach in the assembly 100 due to the excess pressure can allow contaminates from the dirty side of the filter to be passed to the clean side, thus destroying/contaminating the sensor and/or equipment downstream.

Referring again to FIG. 1, and as may be appreciated by inspection of the resonant frequency equation above, the increase in the resonant frequency is roughly proportional to a corresponding increase in the radius r 114 for inlet tubes having a larger diameter D 112. However, as the inlet tube 108 diameter D 112 is decreased below about 1 mm (0.039 in) in diameter, capillary action can begin to take effect, reducing the corresponding change in resonant frequency, and resulting in diminishing returns of the reduction in the resonant frequency, and in some applications, making the inlet tube 108 susceptible to clogging with the decreasing tube diameter D 112.

As may also be appreciated by inspection of the equation above, the resonant frequency F is also inversely proportional to the square root of the length L of the inlet tube 108 and the volume V of the cavity 116. Therefore, the pressure ripple can be suppressed by increasing the inlet tube length L and/or increasing the volume V of cavity 116. However, once the components of the transducer assembly 100 (such as the housing 102 and header 104) are manufactured, the ability to easily vary the inlet tube length L or the cavity volume V can be limited. Furthermore, attempts to alter the diameter D of the inlet tube 108, for example, by drilling the housing 102 after it has been manufactured can be impractical, can damage the housing 102, can effectively decrease the damping and/or increase the resonant frequency.

Figure 2:
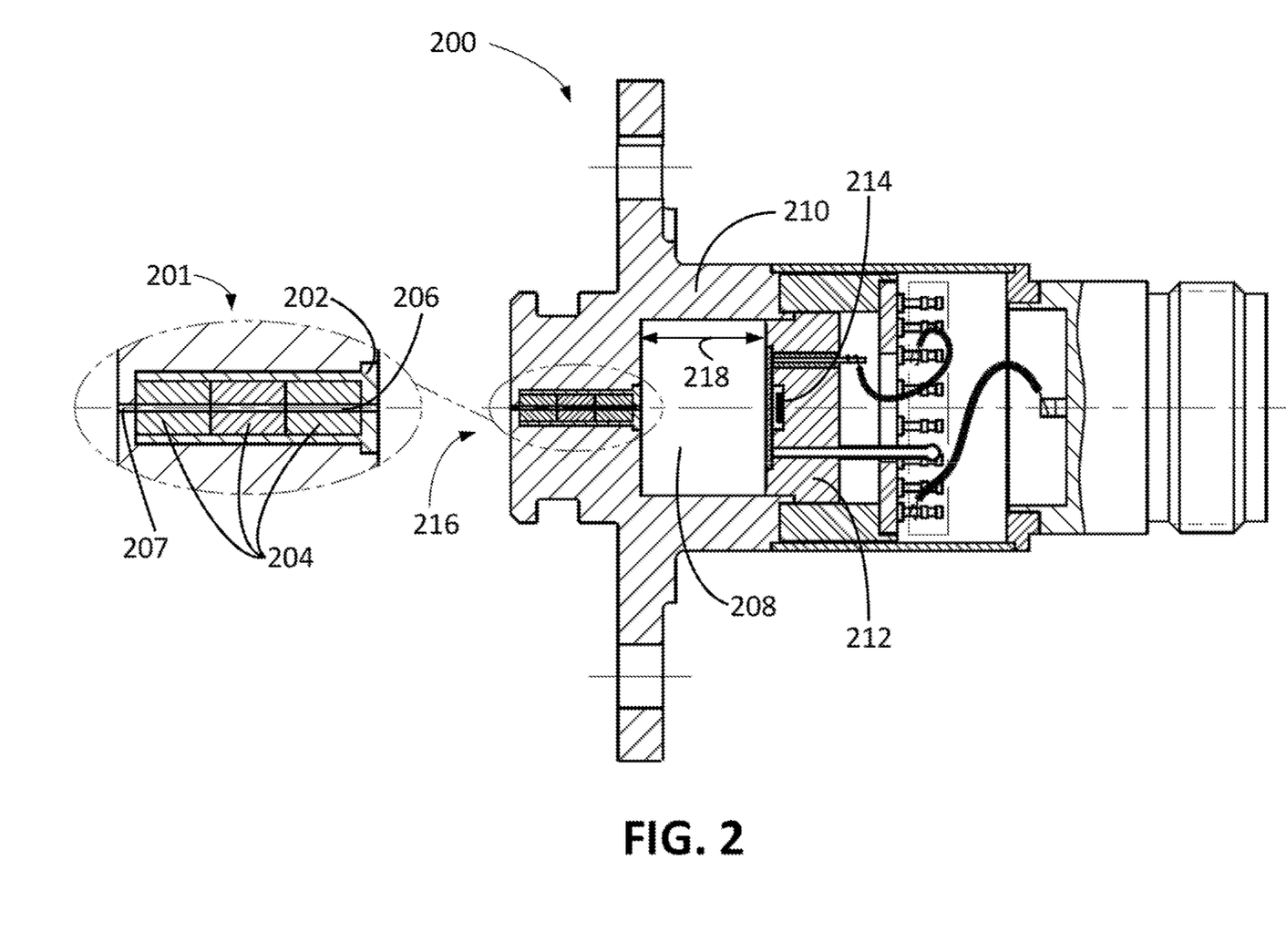
FIG. 2 illustrates a tunable pressure transducer assembly including a detailed inset view of the input tube dimensions defined by tube inserts, in accordance with exemplary embodiments of the disclosed technology.

FIG. 2 depicts a cross-sectional side-view illustration of a tunable pressure transducer assembly 200, according to an exemplary implementation of the disclosed technology. The left-hand portion of FIG. 2 depicts an inset view illustrating an example input tube filter assembly 201 configured to accept one or more inserts 204 that may be selected to achieve a desired damping ratio and/or resonant frequency, for example, to avoid certain pressure ripple frequencies in the pressure media for a given measurement application. Certain example implementations of the disclosed technology may utilize an insert holder 202 to house the inserts 204.

As discussed above, pressure media being measured can comprise high frequency pressure ripples that can interfere with the accuracy of the sensing element 214 and shorten its operable lifespan. The pressure transducer assembly 200 of the disclosed technology may be selectively tuned to achieve desired parameters via the configurable input tube filter assembly 201, for example, to eliminate undesirable high frequency ripples while allowing desirable static and quasi-static pressures to pass and be measured by the sensing element 214.

In accordance with certain exemplary implementations of the disclosed technology, each of the inserts 204 may be manufactured to include one or more bores 206 extending therethrough from a first end to a second end. In certain exemplary implementations, each insert 204 may be manufactured with a corresponding bore 206 having a diameter selected from a range of diameters, and machined/drilled separately from the housing 210. For example, the bore(s) 206 in each insert 204 may be precision drilled before being selected and installed such that the bores 206 of the individual inserts 204 line-up with one another, resulting in an input tube 201 having an effective length equal to the sum of the lengths of the individual inserts 204. In certain example implementations, an insert holder 202 may be utilized to house and/or constrain the one or more inserts 204.

According to certain example implementations, the typical ripple frequencies that may be dampened by the disclosed technology may range in frequency from about 500 Hz to about 3 KHz. According to an example implementation of the disclosed technology, a typical diameter of the bores 206 of the inserts 204 can range from about 0.25 mm (0.01 in) to about 1.3 mm (0.05 in). According to an example implementation of the disclosed technology, a typical length of the (single or plural) inserts 204 can range from about 2.5 mm (0.1 in) to about 13 mm (0.5 in).

In accordance with certain example implementations of the disclosed technology, an aspect ratio for the inserts 204 may be defined as the length of the bores 206 of the inserts 204 divided by the diameter of the bores 206 of the inserts 204. In accordance with certain example implementations of the disclosed technology, the total aspect ratio (for the single and/or plural stacked inserts) may range from approximately 2 to approximately 50. In certain example implementations, two or more inserts 204 may be utilized when the total aspect ratio is greater than about 5. In a preferable implementations, two or more inserts 204 may be utilized when the total aspect ratio is greater than about 10.

According to certain exemplary implementations of the disclosed technology, the bores 206 may be machined using various techniques, including but not limited to laser drilling, mechanical drilling, electrical discharge machining (EDM) drilling, etc. In certain example implementations, the inserts 204 may be manufactured to have bore diameters in the range of about 100 microns to about 2 millimeters (about 0.004 in to about 0.080 in).

In certain exemplary implementations, the bores 206 may be drilled so that the bore diameters result in the range of about 100 microns to about 200 microns. In certain exemplary implementations, the bores 206 may be drilled so that the bore diameters result in the range of about 200 microns to about 300 microns. In certain exemplary implementations, the bores 206 may be drilled so that the bore diameters result in the range of about 300 microns to about 400 microns. In certain exemplary implementations, the bores 206 may be drilled so that the bore diameters result in the range of about 400 microns to about 500 microns. In certain exemplary implementations, the bores 206 may be drilled so that the bore diameters result in the range of about 500 microns to about 600 microns. In certain exemplary implementations, the bores 206 may be drilled so that the bore diameters result in the range of about 600 microns to about 800 microns. In certain exemplary implementations, the bores 206 may be drilled so that the bore diameters result in the range of about 800 microns to about 1 millimeter. In certain example implementations, the inserts 204 may be manufactured to have bore diameters in the range of about 1 millimeter to about 1.3 millimeters. In certain example implementations, the inserts 204 may be manufactured to have bore diameters in the range of about 1.3 millimeter to about 1.5 millimeters. In certain example implementations, the inserts 204 may be manufactured to have bore diameters in the range of about 1.5 millimeter to about 2 millimeters. In this respect, the pressure transducer assembly 200 may be custom tuned by the selection and installation of the one or more inserts 204 to achieve a desired dampening ratio and/or cutoff frequency.

According to certain example implementations of the disclosed technology, multiple inserts 204 having the desired diameter bores 206 may be selected and stacked together to form an effective input tube having the desired bore diameter and length, as will be further discussed below with reference to FIG. 3A and FIG. 3B.

As depicted in the leftmost portion of the inset diagram of the input tube assembly 201, the inlet tip bore 207 may be machined/drilled in the housing 210 with dimensions selected independent of the insert bore 206 dimensions. For example, the dimensions of the inlet tip bore 207 may be sized based on factors such as the viscosity and/or particle size in the pressure medium, and/or to avoid clogging. In certain exemplary implementations, the length of inlet tip bore 207 may be short enough that it has a negligible effect on the damping ratio and cut-off frequency of the resulting input tube assembly 201.

In certain exemplary implementations, the tunable pressure transducer assembly 200 may include a cavity 208 of fixed volume defined by the housing 210 and header 212 and may in communication with the bore(s) 206 of the insert(s) 204. According to an exemplary implementation of the disclosed technology, a sensing element 214 may be mounted on the header 212 and configured to measure an applied pressure within the cavity 208, as at least partially filtered by the input tube assembly 201 via the corresponding insert(s) 204. The volume of the cavity 208 may be set by the dimensions of the housing 210 and/or the header 214, thus providing additional manufacturable parameters that may be utilized to provide desired tuning specifications of the assembly 200.

In accordance with certain exemplary implementations of the disclosed technology, an insert holder 202 may be utilized to constrain the one or more inserts 204. In certain example implementations, the insert holder 202 may be press-fit into the corresponding channel defined in the housing 210, and then the inserts 204 may be inserted into the insert holder 202. In other implementations, the inserts 204 may first be installed in the insert holder 202, which may then be press-fit into the corresponding channel defined in the housing 210. In certain exemplary implementations, the insert holder 202 may be further secured to the housing 210 using a weld. In certain exemplary implementations, the inserts 204 may be secured to the insert holder 202 using a weld, press fit, etc. In certain example implementations, the inserts 204 and/or the insert holder 202 may be configured to be removeable/replaceable so that the input tube assembly 201 can be selectively tuned for a given application.

Certain technical improvements, cost savings, and/or flexibility may be achieved by the disclosed technology. For example, the manufacturing process of the housing 210 can be decoupled from the precision manufacturing process of the inserts 204, thereby allowing different manufacturing tolerances for the housings 210 vs. the inserts 204. Furthermore, a batch of housings 210 manufactured with the same dimensions may be individually tuned by the selection of inserts 204. In certain exemplary implementations, the inserts 204 may be made from the same material as the housing 210, such as stainless steel or ceramic. In certain exemplary implementations, the inserts 204 may be machined/drilled from blanks such that any defect resulting from machining the bore 206 therethrough will not necessitate discarding (or re-machining) an entire housing 210.

In accordance with certain exemplary implementations of the disclosed technology, and as depicted in the inset drawing of the input tube assembly 201 on the left-hand side of FIG. 2, multiple individual sections of the inserts 204 may be stacked to create a continuous bore 206 extending from the input port 216 of the assembly 200 to the cavity 208 portion. In certain exemplary implementations, this multi-section stacking feature of the inserts 204 may result in a relatively long effective filtering bore 206 without requiring drilling such a long, continuous bore through the housing 210 (or through a long insert section) which may simplify the drilling process, improve the dimensional tolerance and/or improve the uniformity of the bore 206.

In accordance with certain exemplary implementations of the disclosed technology, the housing 210 and/or header 212 may be configured with certain dimensions that can be controlled (during the initial manufacturing process and/or in a separate machining step) to result in a suitable volume of the cavity 208 for a given application and/or damping specification. Thus, certain implementations of the disclosed technology provide for additional process variables (in addition to selection and insertion of appropriate inserts 204 into the holder 206) that can be utilized to tune the assembly 200, for example, by controlling one or more dimensions 218 of the cavity 208 via the structure of the housing 210 and/or the configuration of the header 212.

In accordance with certain example implementations of the disclosed technology, the tunable transducer assembly 200 shown in FIG. 2 may also utilize the sensing element 214 to sense applied pressure by receiving incoming pressure media that is applied to the input port 216 of the housing 210, directed through the bore 206 defined by the inserts 204, and then directed into the cavity 208. According to certain exemplary implementations of the disclosed technology, the flow and frequency of the pressure media presented to the sensing element 214 may be altered by changing the dimensions of the low pass mechanical filter as defined at least by the dimensions of bore 206 and the cavity 208. One skilled in the art will appreciate that the housing 210 and/or input port 216 can be customized to fit many configurations, for example but not limited to, O-ring seals and threads.

One skilled in the art will appreciate that narrowing the bore 206 (i.e., decreasing the diameter) enhances attenuation. However, if the bore 206 is too narrow for the applied pressure media, desirable low frequency components (e.g., static and quasi-static pressures) may also be eliminated, which may interfere with the accuracy of the sensing element 214. Conversely, if the bore 206 is too wide, high frequency ripples may not be sufficiently eliminated, which can also interfere with the accuracy of the sensing element 214 and decrease its operable lifespan.

In accordance with certain example implementations of the disclosed technology, micro electrical discharge machining (EDM) may be utilized to drill the bores 206 in the inserts 204 with high accuracy. Those having skill in the art of EDM may understand that the aspect ratio (length divided by diameter) of a bore drilled by EDM can be greater than bores machined by other processes such as etching, mechanical drilling, laser ablation, etc. However, the drilling speed of micro EDM can slow down or stop when the aspect ratio of a bore reaches a certain value. In some instances, particularly with bores having diameters on the order of 500 microns or less, it can be difficult to create bores with an aspect ratio greater than about 10 due to phenomena such as secondary sparking, debris accumulation, etc. Such factors can limit the practical depth and processing speed for which a bore 206 can be drilled in a single piece of material, such as metal or stainless steel.

To address some of the above-referenced limitations, and according to certain example implementations of the disclosed technology, multiple inserts 204 having the desired diameter bores 206 may be selected and stacked together to form an effective input tube having the desired bore diameter and length.

Figure 3A:
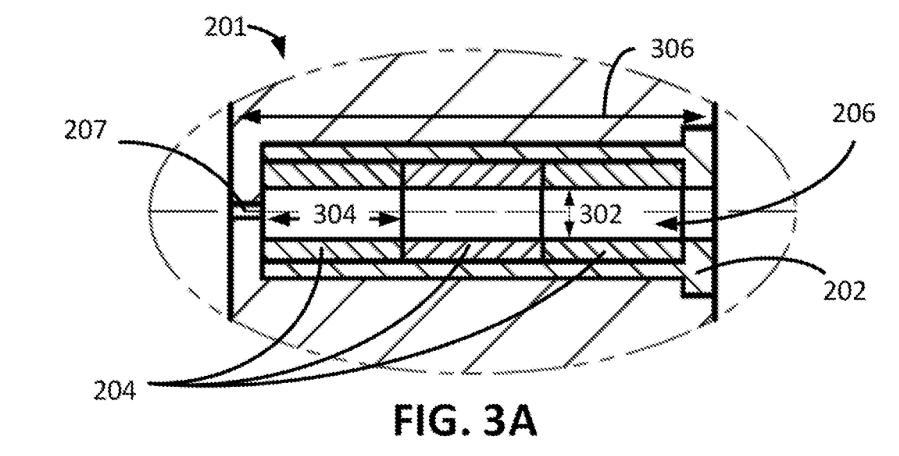
FIG. 3A illustrates an input tube comprising a holder and inserts, in accordance with exemplary embodiments of the disclosed technology.

FIG. 3A illustrates an inset view of an input tube assembly 201 comprising (an optional) holder 202 and one or more inserts 204, in accordance with exemplary embodiments of the disclosed technology. In some implementations, multiple inserts 204 may be stacked to form a filtering bore 206 having an effective length 306 ranging from about 3 millimeters to about 50 millimeters (about 0.12 in to about 2.0 in).

In certain exemplary implementations, the insert holder 202 may be configured to hold approximately 1-5 inserts 204, with each insert characterized by a length 304 of about 3 millimeters to about 50 millimeters. In this respect, and according to various exemplary embodiments, the length 304 of the inserts 204 may be reduced with decreasing bore diameter 302 to facilitate accurate bore drilling by limiting the corresponding aspect ratio (length/diameter) of the bore in each insert 204, and the effective length 306 may be achieved by stacking the inserts 204 together.

In certain exemplary implementations, the insert holder 202 may be configured to hold 1 insert 204, with the insert 204 characterized by the following length 304 ranges: about 3 millimeters to about 10 millimeters; about 10 millimeters to about 20 millimeters; about 20 millimeters to about 30 millimeters; about 30 millimeters to about 40 millimeters; and/or about 40 millimeters to about 50 millimeters.

In certain exemplary implementations, the insert holder 202 may be configured to hold 2 inserts 204, with each of the 2 inserts 204 characterized by the following length 304 ranges: about 1.5 millimeters to about 5 millimeters; about 5 millimeters to about 10 millimeters; about 10 millimeters to about 15 millimeters; about 15 millimeters to about 20 millimeters; and/or about 20 millimeters to about 50 millimeters.

In certain exemplary implementations, the insert holder 202 may be configured to hold 3 inserts 204, with each of the 3 inserts 204 characterized by the following length 304 ranges: about 1 millimeters to about 3.3 millimeters; about 3.3 millimeters to about 6.6 millimeters; about 6.6 millimeters to about 10 millimeters; about 10 millimeters to about 13.3 millimeters; and/or about 13.3 millimeters to about 16.6 millimeters.

In certain exemplary implementations, the insert holder 202 may be configured to hold 4 inserts 204, with each of the 4 inserts 204 characterized by the following length 304 ranges: about 0.75 millimeters to about 2.5 millimeters; about 2.5 millimeters to about 5 millimeters; about 5 millimeters to about 7.5 millimeters; about 7.5 millimeters to about 10 millimeters; and/or about 10 millimeters to about 25 millimeters.

In certain exemplary implementations, the insert holder 202 may be configured to hold 5 inserts 204, with each of the 5 inserts 204 characterized by the following length 304 ranges: about 0.6 millimeters to about 2 millimeters; about 2 millimeters to about 4 millimeters; about 4 millimeters to about 6 millimeters; about 6 millimeters to about 8 millimeters; and/or about 8 millimeters to about 10 millimeters.

Certain example implementations of the various number count, lengths, and bore diameters of the various inserts 204 will be further discussed below with reference to FIG. 5.

different bore diameters 306 to achieve various effective damping and/or resonance, as desired.

The following example may be utilized to illustrate an application where two or more stacked inserts 204 may be appropriately selected and utilized to form an input tube assembly 201. To achieve desired damping and resonance specifications, a tunable transducer assembly (such as assembly 200 shown in FIG. 2) may require an input tube assembly 201 having an effective length 306 of 10 millimeters and a bore diameter 302 of 0.5 millimeters, resulting in an effective aspect ratio of 20, which may be difficult to obtain by drilling a bore 206 through a single insert 204 of length 304 of 10 millimeters. For example, depending on certain EDM or other drilling techniques, a reasonable aspect ratio for a bore 206 having a diameter 302 of 0.5 millimeters may be less than 5, limiting the bore length 304 through a single insert 204 to less than 2.5 millimeters. Thus, in this example, four inserts 204 may be drilled with bore diameters 302 of 0.5 millimeters and stacked together to form an input tube assembly 201 having an effective input tube length 306 of 10 millimeters and a bore diameter 302 of 0.5 millimeters.

Table 1 lists effective bore lengths 306 (in millimeters) as a function of the aspect ratio (leftmost column) and bore diameter 302 (top row). In accordance with certain example implementations of the disclosed technology, the number of inserts 204 that may be utilized to form an input tube assembly may be expressed as "CEIL(TRUNC((Aspect Ratio)/x))" where "x" may vary as a function of the bore diameter 302, and where "x" represents the largest (or upper range) of an Aspect Ratio for which an accurate bore may be drilled through a continuous (single) insert for a given bore diameter 302. In certain example implementations in which the bore diameter 302 is less than 0.5 millimeters, it may be difficult to achieve an aspect ratio greater than 5. Thus, for an input tube input tube assembly 201 having an effective input tube length 306 of 10 millimeters and a bore diameter 302 of 0.5 millimeters (resulting in an Aspect Ratio of 20), a number of inserts to utilize may be calculated as CEIL(TRUNC(20/5))=4.

TABLE 1

Total bore length (in millimeters) as a function of Aspect Ratio (leftmost column) and bore diameter (top row).

| | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
|---|---|---|---|---|---|---|---|---|---|---|---|---|---|---|---|---|---|---|---|---|
| 1 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
| 2 | 0.2 | 0.4 | 0.6 | 0.8 | 1 | 1.2 | 1.4 | 1.6 | 1.8 | 2 | 2.2 | 2.4 | 2.6 | 2.8 | 3 | 3.2 | 3.4 | 3.6 | 3.8 | 4 |
| 3 | 0.3 | 0.6 | 0.9 | 1.2 | 1.5 | 1.8 | 2.1 | 2.4 | 2.7 | 3 | 3.3 | 3.6 | 3.9 | 4.2 | 4.5 | 4.8 | 5.1 | 5.4 | 5.7 | 6 |
| 4 | 0.4 | 0.8 | 1.2 | 1.6 | 2 | 2.4 | 2.8 | 3.2 | 3.6 | 4 | 4.4 | 4.8 | 5.2 | 5.6 | 6 | 6.4 | 6.8 | 7.2 | 7.6 | 8 |
| 5 | 0.5 | 1 | 1.5 | 2 | 2.5 | 3 | 3.5 | 4 | 4.5 | 5 | 5.5 | 6 | 6.5 | 7 | 7.5 | 8 | 8.5 | 9 | 9.5 | 10 |
| 6 | 0.6 | 1.2 | 1.8 | 2.4 | 3 | 3.6 | 4.2 | 4.8 | 5.4 | 6 | 6.6 | 7.2 | 7.8 | 8.4 | 9 | 9.6 | 10.2 | 10.8 | 11.4 | 12 |
| 7 | 0.7 | 1.4 | 2.1 | 2.8 | 3.5 | 4.2 | 4.9 | 5.6 | 6.3 | 7 | 7.7 | 8.4 | 9.1 | 9.8 | 10.5 | 11.2 | 11.9 | 12.6 | 13.3 | 14 |
| 8 | 0.8 | 1.6 | 2.4 | 3.2 | 4 | 4.8 | 5.6 | 6.4 | 7.2 | 8 | 8.8 | 9.6 | 10.4 | 11.2 | 12 | 12.8 | 13.6 | 14.4 | 15.2 | 16 |
| 9 | 0.9 | 1.8 | 2.7 | 3.6 | 4.5 | 5.4 | 6.3 | 7.2 | 8.1 | 9 | 9.9 | 10.8 | 11.7 | 12.6 | 13.5 | 14.4 | 15.3 | 16.2 | 17.1 | 18 |
| 10 | 1 | 2 | 3 | 4 | 5 | 6 | 7 | 8 | 9 | 10 | 11 | 12 | 13 | 14 | 15 | 16 | 17 | 18 | 19 | 20 |
| 11 | 1.1 | 2.2 | 3.3 | 4.4 | 5.5 | 6.6 | 7.7 | 8.8 | 9.9 | 11 | 12.1 | 13.2 | 14.3 | 15.4 | 16.5 | 17.6 | 18.7 | 19.8 | 20.9 | 22 |
| 12 | 1.2 | 2.4 | 3.6 | 4.8 | 6 | 7.2 | 8.4 | 9.6 | 10.8 | 12 | 13.2 | 14.4 | 15.6 | 16.8 | 18 | 19.2 | 20.4 | 21.6 | 22.8 | 24 |
| 13 | 1.3 | 2.6 | 3.9 | 5.2 | 6.5 | 7.8 | 9.1 | 10.4 | 11.7 | 13 | 14.3 | 15.6 | 16.9 | 18.2 | 19.5 | 20.8 | 22.1 | 23.4 | 24.7 | 26 |
| 14 | 1.4 | 2.8 | 4.2 | 5.6 | 7 | 8.4 | 9.8 | 11.2 | 12.6 | 14 | 15.4 | 16.8 | 18.2 | 19.6 | 21 | 22.4 | 23.8 | 25.2 | 26.6 | 28 |
| 15 | 1.5 | 3 | 4.5 | 6 | 7.5 | 9 | 10.5 | 12 | 13.5 | 15 | 16.5 | 18 | 19.5 | 21 | 22.5 | 24 | 25.5 | 27 | 28.5 | 30 |
| 16 | 1.6 | 3.2 | 4.8 | 6.4 | 8 | 9.6 | 11.2 | 12.8 | 14.4 | 16 | 17.6 | 19.2 | 20.8 | 22.4 | 24 | 25.6 | 27.2 | 28.8 | 30.4 | 32 |
| 17 | 1.7 | 3.4 | 5.1 | 6.8 | 8.5 | 10.2 | 11.9 | 13.6 | 15.3 | 17 | 18.7 | 20.4 | 22.1 | 23.8 | 25.5 | 27.2 | 28.9 | 30.6 | 32.3 | 34 |
| 18 | 1.8 | 3.6 | 5.4 | 7.2 | 9 | 10.8 | 12.6 | 14.4 | 16.2 | 18 | 19.8 | 21.6 | 23.4 | 25.2 | 27 | 28.8 | 30.6 | 32.4 | 34.2 | 36 |
| 19 | 1.9 | 3.8 | 5.7 | 7.6 | 9.5 | 11.4 | 13.3 | 15.2 | 17.1 | 19 | 20.9 | 22.8 | 24.7 | 26.6 | 28.5 | 30.4 | 32.3 | 34.2 | 36.1 | 38 |
| 20 | 2 | 4 | 6 | 8 | 10 | 12 | 14 | 16 | 18 | 20 | 22 | 24 | 26 | 28 | 30 | 32 | 34 | 36 | 38 | 40 |

Figure 3B:
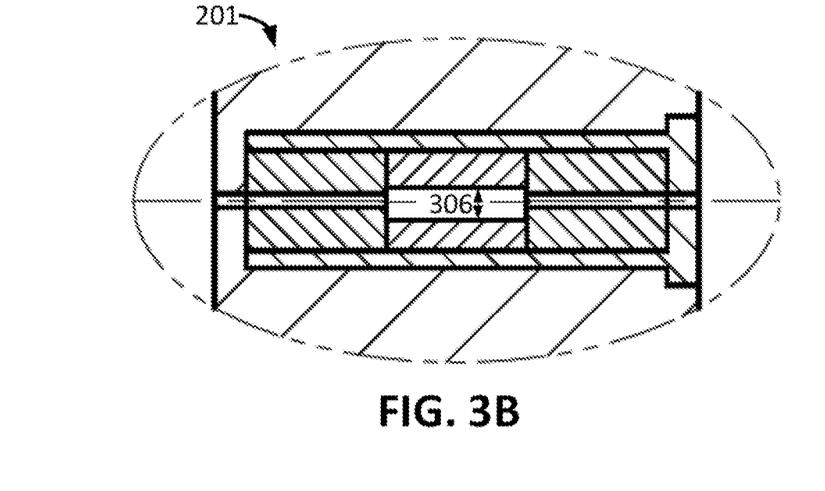
FIG. 3B illustrates an input tube comprising a holder and inserts, in accordance with exemplary embodiments of the disclosed technology.

FIG. 3B illustrates another inset view of an input tube assembly 201 having inserts 204 stacked together with As another illustrative example, consider an input tube assembly 201 having an effective input tube length 306 of 24 millimeters and a bore diameter 302 of 1.5 millimeters (resulting in an Aspect Ratio of 16). For this larger bore diameter, it may be possible to achieve an Aspect Ratio of 10 when drilling through a continuous (single) insert. Thus, in this example, a minimum number of inserts to utilize may be calculated as CEIL(TRUNC(16/10))=2.

According to certain example implementations of the disclosed technology, the value "x" utilized for calculating the number of inserts 204 (via the equation discussed above: CEIL(TRUNC((Aspect Ratio)/x))) may be a function of the desired bore diameter 302. In one example implementation of the disclosed technology, "x" may be set as needed in a range of about 3 to about 5 for bore diameters ranging from about 0.1 millimeters to about 0.5 millimeters. In an example implementation "x" may be set as needed in a range of about 5 to about 10 for bore diameters ranging from about 1 millimeter to about 1.5 millimeter. In an example implementation "x" may be set in a range of about 10 to about 15 for bore diameters ranging from about 1.5 millimeters to about 2 millimeters. As may be appreciated, the value for setting "x" may be experimentally determined and may vary depending on the technique utilized to drill the bore.

In the interest of brevity, while the above example demonstrates a specific (non-exhaustive) configuration, certain embodiments of the disclosed technology can apply to numerous other pressure transducer configurations without limit, preferably in systems where the needed aspect ratio of the input tube is greater than about 5, and for bore diameters less than about 1 millimeter. Certain example implementations of the disclosed technology may include one or more inserts 204. Certain example implementations of the disclosed technology may include two or more inserts 204. Certain example implementations of the disclosed technology may include three or more inserts 204.

Figure 4A:
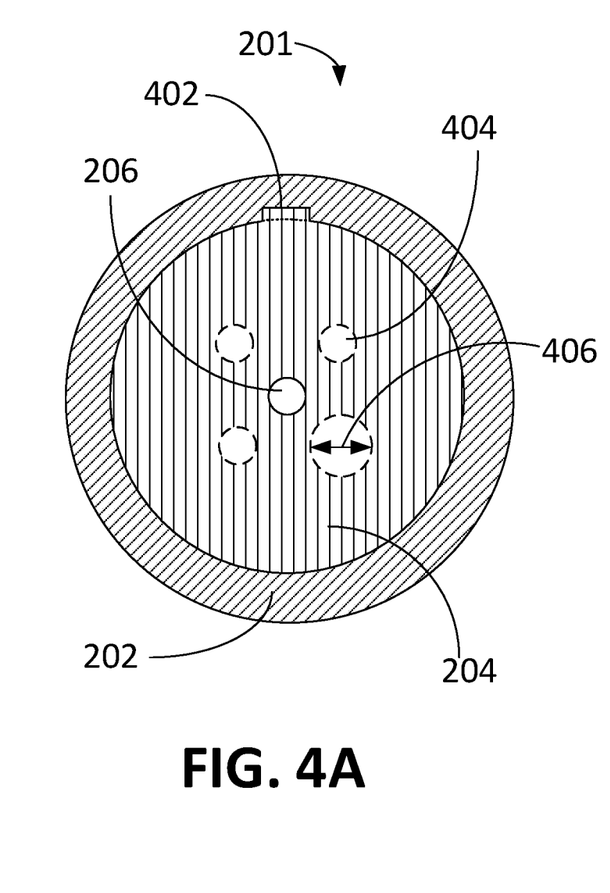
FIG. 4A illustrates an end view of a cylindrical input tube comprising tube inserts having optional additional bores, in accordance with exemplary embodiments of the disclosed technology.

FIG. 4A illustrates an end view of a cylindrical input tube assembly 201 comprising a holder 202 and inserts 204 having a central bore 206 (as discussed above). In certain exemplary implementations, optional additional bores 404 may be machined in the inserts 204 as needed to achieve the desired filtering/damping. In some implementations, the addition or omission of the additional bores 404 may provide flexibility in the associated bore diameters, for example, to enable anti-clogging features and/or to achieve the desired filtering/damping. In certain exemplary implementations, the additional bores 404 may be drilled with different diameters 406 to achieve the desired damping/anti-clogging specifications. In some implementations, particularly when optional additional bores 404 are utilized, a key registration feature 402 may be included to prevent rotation of the inserts 204, and to allow any non-axial bores 404 to line up with corresponding bores in the adjacent inserts.

Figure 4B:
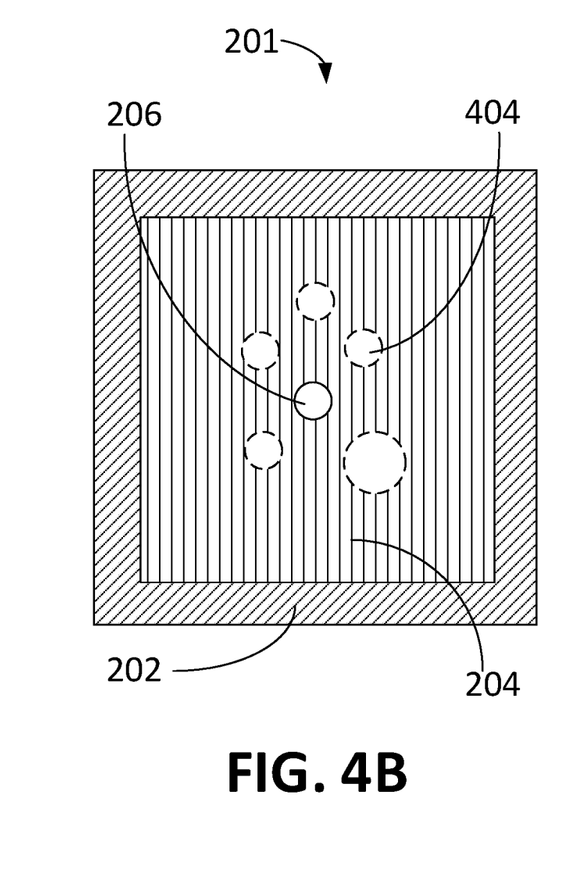
FIG. 4B illustrates an end view of a rectangular input tube comprising tube inserts having optional additional bores, in accordance with exemplary embodiments of the disclosed technology.

FIG. 4B illustrates an inset view of a square-shaped input tube assembly 201 comprising a holder 202 and inserts 206 having optional additional bores 404, in accordance with exemplary embodiments of the disclosed technology. In this implementation, the shape of the holder 202 and inserts 206 may be such that a registration key feature (such a feature 402 shown in FIG. 4A) is not needed to eliminate axial rotation of the inserts 206. It may be recognized that various other shapes of these components may be utilized without departing from the scope of the disclosed technology.

Figure 5:
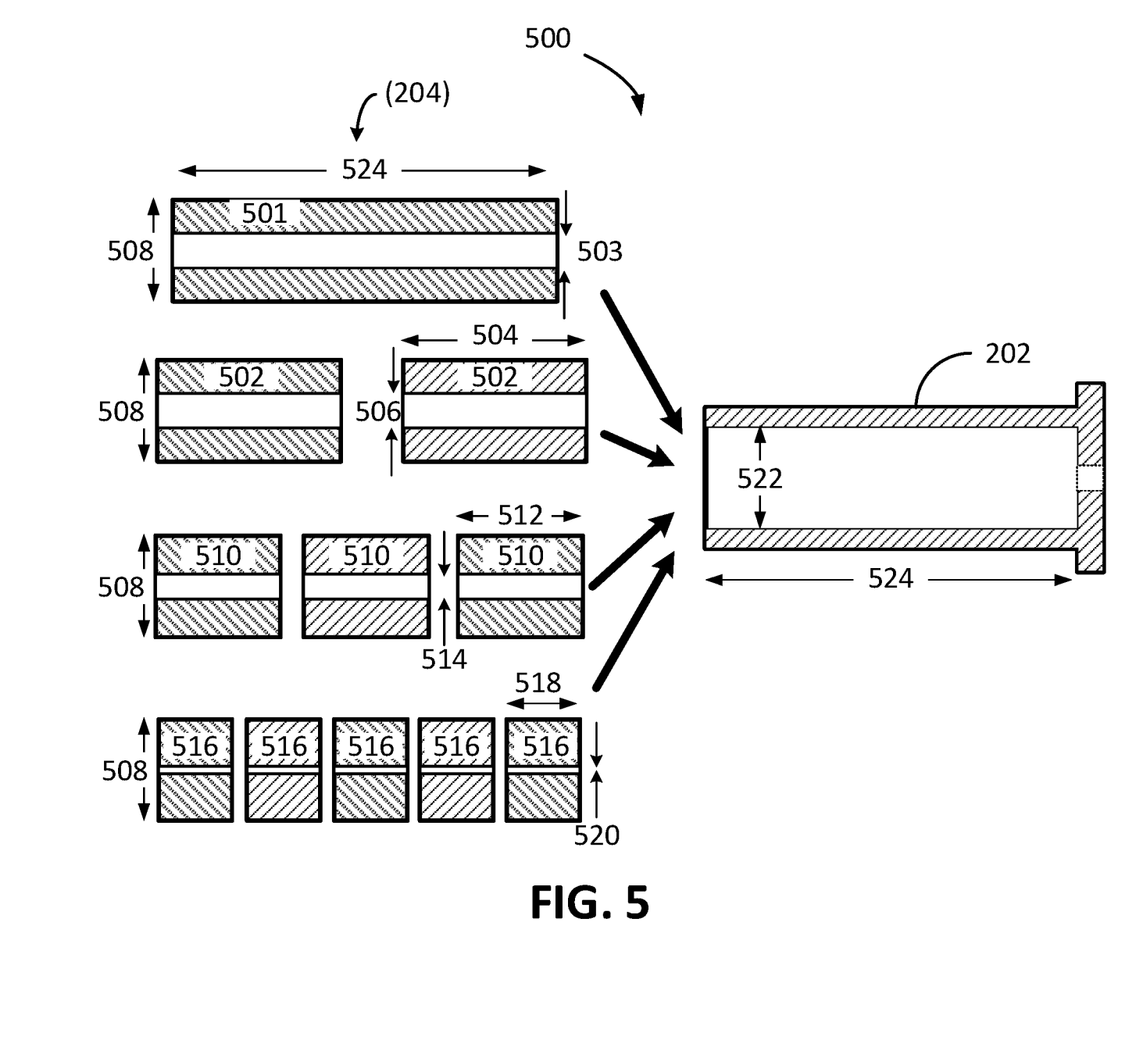
FIG. 5 illustrates a kit having groupings of tube inserts, in accordance with exemplary embodiments of the disclosed technology.

FIG. 5 illustrates an example insert kit 500 having a holder 202 and inserts 204 that are selectable for grouping and insertion into the holder 202. FIG. 5 illustrates the various example kit inserts 501, 502, 510, 516 with corresponding lengths 524, 504, 512, 518 and corresponding bore diameters 503, 506, 514, 520, as discussed above with respect to FIG. 3A. In accordance with certain example implementations of the disclosed technology, each insert 204 may be characterized by a common outer diameter 508 configured to fit snugly within the inner diameter 522 of the holder 202. Further, as discussed above with respect to FIG. 3A, the lengths 524, 504, 512, 518 and corresponding number of the inserts 204 (1, 2, 3, and 5 in this example) may be set so that selection and insertion of the group of like inserts into the holder 202 results in an effective insert (or stack of inserts) with a length about equal to the length 524 of the insert holder 202.

In accordance with certain example implementations of the disclosed technology, the kit 500 may include additional components, such as the housing 210, header 212, sensor 214, and/or various connectors, electronics, and ports as illustrated in FIG. 2. In accordance with certain example implementations of the disclosed technology, the populated insert holder 202 may then be inserted into and secured to the corresponding input channel of the housing.

Figure 6:
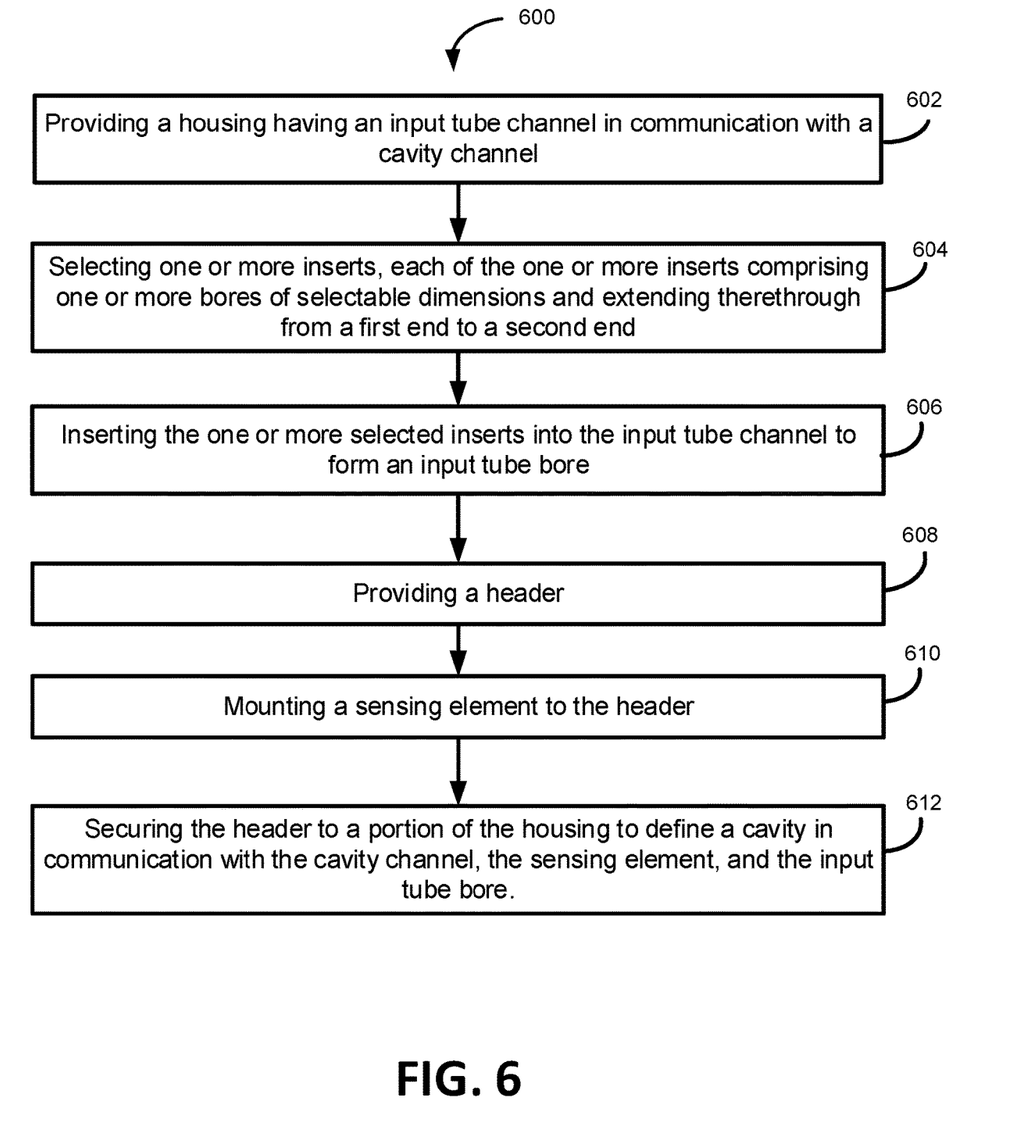
FIG. 6 is a flow diagram of a method, in accordance with exemplary embodiments of the disclosed technology.

FIG. 6 is a flow diagram of a method 600, in accordance with exemplary embodiments of the disclosed technology. In block 602, the method 600 includes providing a housing having an input tube channel in communication with a cavity channel In block 604, the method 600 includes selecting one or more inserts, each of the one or more inserts comprising one or more bores of selectable dimensions and extending therethrough from a first end to a second end. In block 606, the method 600 includes inserting the one or more selected inserts into the input tube channel to form an input tube bore. In block 608, the method 600 includes providing a header. In block 610, the method 600 includes mounting a sensing element to a header. In block 612, the method 600 includes securing the header to a portion of the housing to define a cavity in communication with the cavity channel, the sensing element, and the input tube bore.

Certain example implementations of the disclosed technology can include providing an insert holder, inserting the one or more selected inserts within the insert holder, and disposing the insert holder with the one or more selected inserts into the input tube channel of the housing.

In certain example implementations, selecting and inserting the one or more inserts into the input tube channel can include selecting and inserting two or more inserts into the input tube channel, wherein an effective length of the input tube bore is defined by a sum of lengths of the bores of the two or more inserts.

Certain example implementations of the disclosed technology can include forming a registration key feature in the one or more inserts to prevent rotation of the one or more inserts in the input tube channel.

In some implementations, disposing the insert holder with the one or more selected and inserts into the input tube channel of the housing can include press-fitting the insert holder into the input tube channel. In certain example implementations, securing the header to a portion of the housing can include welding a portion of header to the housing.

In accordance with certain example implementations of the disclosed technology, a viscosity and a ripple frequency associated with a pressure media may be utilized for selection of the one or more inserts.

Certain implementations can further include measuring, with the sensing element, an input pressure of a pressure medium, and outputting a signal corresponding to the measured input pressure.

According to an exemplary implementation of the disclosed technology, a volume of the cavity may be selectively set by selecting and/or machining the desired dimensions of the housing.

In certain exemplary implementations, one or more frequencies associated with an input pressure may be selectively dampened by selecting the selectable bore dimensions of the one or more inserts.

Certain implementations can include drilling each of the one or more inserts to form the one or more bores. In some implementations, electronic discharge machining techniques may be utilized to precision drill the bores.

In certain implementation where two or more bores are used in each of the two or more inserts, registration key features may be utilized in the insert holder and the inserts to prevent rotation of the two or more inserts in the insert holder.

As used in the specification and the appended claims, the singular forms "a," "an," and "the" include plural referents unless the context clearly dictates otherwise. Also, in describing the preferred embodiments, terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an embodiment includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

We claim:

1. A tunable pressure transducer, comprising:
    a housing that includes:
        an input tube channel; and
        a cavity channel in communication with the input tube channel;
    an input tube filter assembly disposed in the input tube channel and in communication with the cavity channel, the input tube filter assembly comprising:
        one or more inserts disposed in the input tube channel, the one or more inserts comprising one or more bores of selectable dimensions and extending therethrough from a first end to a second end, wherein the one or more inserts define an effective input tube bore, and wherein the input tube filter assembly is tunable by selection of the selectable dimensions of the one or more inserts.

2. The tunable pressure transducer of claim 1, further comprising an insert holder disposed in the input tube channel, wherein the one or more inserts are disposed in the insert holder.

3. The tunable pressure transducer of claim 1, further comprising:
    a header positioned within at least a portion of the cavity channel of the housing, the header and the cavity channel defining a cavity in communication with the input tube channel; and
    a sensing element disposed on the header and adjacent to the cavity.

4. The tunable pressure transducer of claim 3, wherein the input tube filter assembly is configured to control application of an applied pressure to the sensing element, and wherein the input tube filter assembly and cavity form an adjustable low pass mechanical filter configured to receive and filter an input pressure to provide a filtered pressure to the sensing element.

5. The tunable pressure transducer of claim 1, wherein the one or more inserts comprise two or more inserts, and an effective length of the input tube bore is defined by a sum of lengths of the bores of the two or more inserts.

6. The tunable pressure transducer of claim 1, wherein the one or more inserts are selected to provide oscillation dampening of an applied pressure media.

7. The tunable pressure transducer of claim 1, wherein one or more of a length of the effective input tube bore and a volume of the cavity channel are configured to reduce high frequency pressure ripples and allow static and quasi-static pressures to pass.

8. The tunable pressure transducer of claim 1, wherein two or more inserts are disposed in the input tube channel when bore dimensions below a predetermined threshold diameter are selected.

9. The tunable pressure transducer of claim 1, wherein the cavity channel is selectively configurable to set a volume of the cavity channel.

10. A kit, comprising:
    an insert holder defining a holder cavity having an inner diameter and a length;
    one or more grouped sets of one or more inserts configured for selection and insertion into the holder cavity, each insert comprising:
        an outer diameter corresponding to the inner diameter of the holder cavity and
        one or more bores of selectable dimensions, the one or more bores extending therethrough from a first end to a second end of each of the one or more inserts;
    the one or more grouped sets of the one or more inserts are further characterized by a number count and a corresponding effective length equal to a sum of the lengths of the one or more inserts such that the effective length corresponds to the insert holder cavity length;
    wherein the one or more grouped sets of the one or more inserts are configured to define an effective input tube bore of a tunable pressure transducer assembly, wherein the effective input tube bore is tunable by selection and insertion of the one or more grouped sets of one or more inserts into the insert holder.

11. The kit of claim 10, further comprising a housing defining an inlet channel and a cavity channel, wherein the inlet channel is configured to accept the insert holder.

12. The kit of claim 11, further comprising:
a header configured to be positioned within at least a portion of the cavity channel of the housing, the header and the cavity channel defining a cavity in communication with the inlet channel; and
a sensing element configured to be disposed on the header and in communication with the cavity channel.

13. A method, comprising:
providing a housing having an input tube channel in communication with a cavity channel;
selecting one or more inserts, each of the one or more inserts comprising one or more bores of selectable dimensions and extending therethrough from a first end to a second end;
inserting the one or more selected inserts into the input tube channel to form an input tube bore;
providing a header;
mounting a sensing element to a header; and
securing the header to a portion of the housing to define a cavity in communication with the cavity channel, the sensing element, and the input tube bore.

14. The method of claim 13, further comprising:
providing an insert holder;
inserting the one or more selected inserts within the insert holder; and
disposing the insert holder with the one or more selected inserts into the input tube channel of the housing.

15. The method of claim 13, wherein the one or more inserts comprise two or more inserts, and an effective length of the input tube bore is defined by a sum of lengths of the bores of the two or more inserts.

16. The method of claim 13, further comprising forming a registration key feature in the one or more inserts to prevent rotation of the one or more inserts in the input tube channel.

17. The method of claim 14, wherein disposing the insert holder with the one or more selected and inserts into the input tube channel of the housing comprising press-fitting the insert holder into the input tube channel.

18. The method of claim 13, wherein securing the header to a portion of the housing comprises welding a portion of header to the housing.

19. The method of claim 13, wherein a viscosity and a ripple frequency associated with a pressure media is utilized for selection of the one or more inserts.

20. The method of claim 13, further comprising:
measuring, with the sensing element, an input pressure of a pressure medium; and
outputting a signal corresponding to the measured input pressure.

* * * * *